Jan. 26, 1960
J. H. GRAY
2,922,633
IMPACT METER
Filed Aug. 7, 1957
2 Sheets-Sheet 1
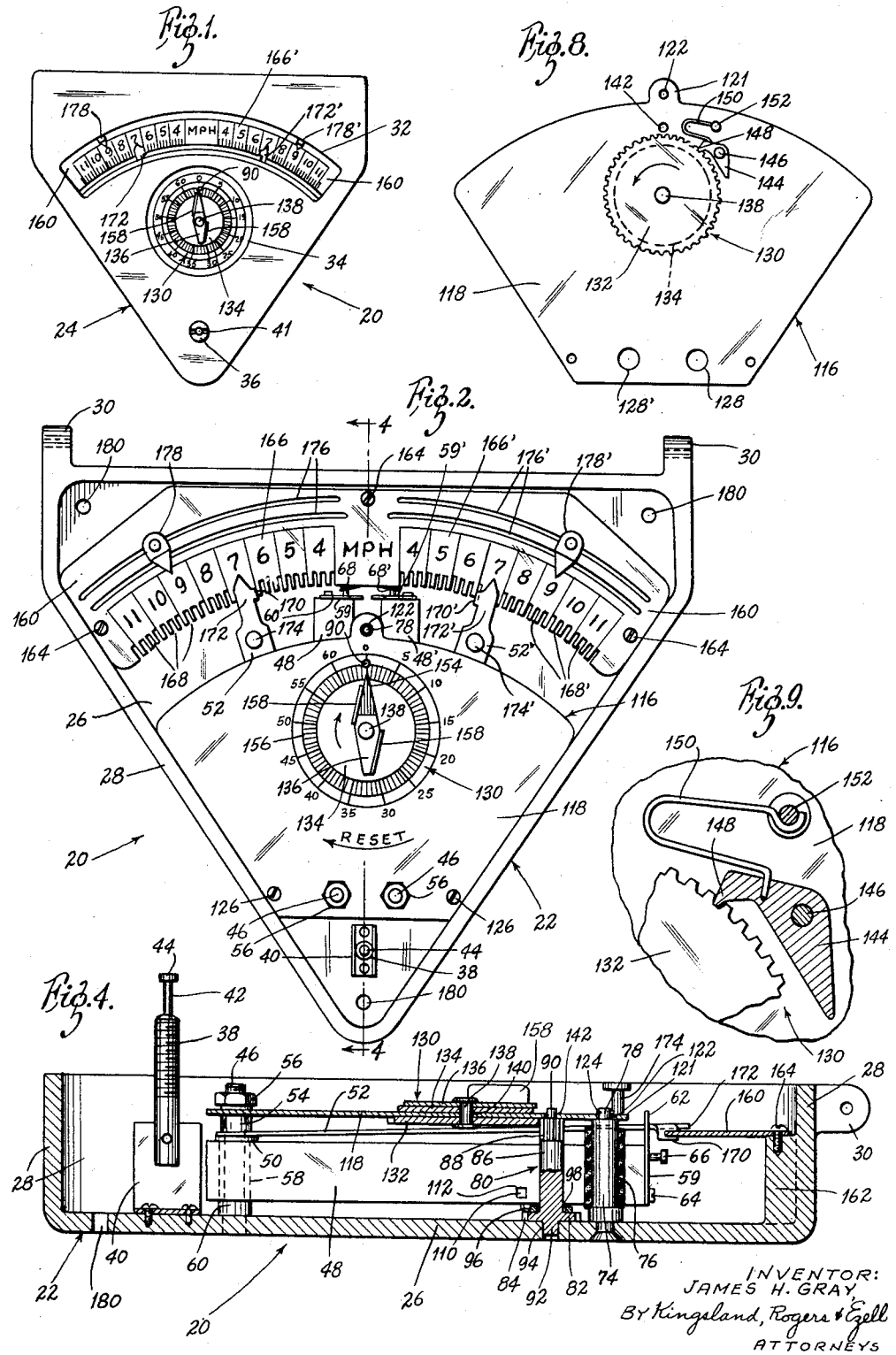
INVENTOR:
JAMES H. GRAY,
By Kingsland, Rogers & Ezell
ATTORNEYS Jan. 26, 1960   J. H. GRAY   2,922,633
IMPACT METER
Filed Aug. 7, 1957   2 Sheets-Sheet 2
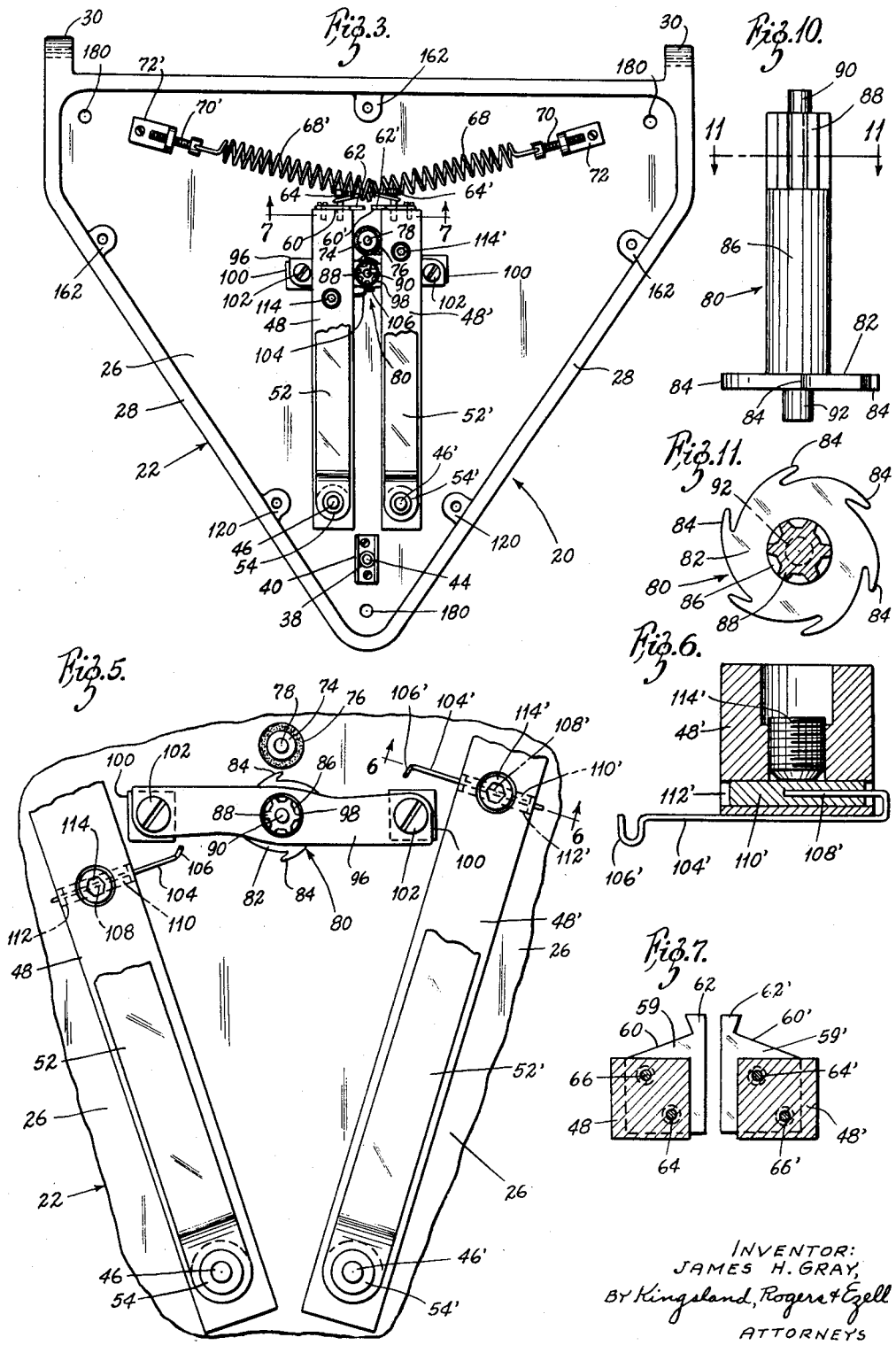
INVENTOR:
JAMES H. GRAY,
By Kingsland, Rogers & Ezell
ATTORNEYS United States Patent Office 2,922,633
Patented Jan. 26, 1960

2,922,633
IMPACT METER
James H. Gray, Clayton, Mo.
Application August 7, 1957, Serial No. 676,802
2 Claims. (Cl. 264—1)

The present invention relates generally to impact measuring devices, and more particularly to an impact meter which incorporates novel means for counting the number of individual impacts of predetermined minimum magnitude received in either of two opposite directions.

The invention represents an improvement over the impact meter disclosed in my application bearing Serial Number 449,612, filed August 13, 1954. The device of the aforesaid application functions only to indicate the maximum magnitudes of all impact accelerations sustained by the meter in each of two opposite directions, whereas the meter of the present invention serves, additionally, to record the total number of significant impacts to which the device is subjected.

It is an object of the present invention to provide a novel device for indicating both the frequency of occurrence of rough treatment and the maximum degree of rough treatment in connection with the transportation of merchandise.

It is another function of the invention to provide a novel meter for measuring successive impact accelerations and for recording both the maximum degree of acceleration and the total number of accelerations above a predetermined minimum.

It is another object of the invention to provide a novel meter for measuring successive impact accelerations received in either of two opposite directions along a single axis and for recording the total number of accelerations exceeding individually selected minimums.

Further objects of the invention are to provide a novel impact meter which is simple and efficient in its design, which is fundamentally rugged in its construction, which is dependable and accurate in its operation, and which is otherwise well-suited for its intended use.

The foregoing, along with additional objects and advantages, will be apparent from the following description taken in conjunction with the accompanying drawings, in which:

Figure 1 is a front elevational view of an impact meter constructed in accordance with the teachings of the present invention;

Figure 2 is an enlarged elevational view similar to Figure 1, but showing the meter with its front cover removed;

Figure 3 is an elevational view similar to Figure 2, but with additional parts removed;

Figure 4 is an enlarged sectional view taken generally along the line 4—4 of Figure 2;

Figure 5 is an enlarged fragmentary elevational view similar to the central portion of Figure 3, but showing certain parts in moved position;

Figure 6 is a further enlarged sectional view taken generally along the line 6—6 of Figure 5;

Figure 7 is an enlarged sectional view taken generally along the line 7—7 of Figure 3;

Figure 8 is a bottom plan view of a removed dial plate assembly;

Figure 9 is an enlarged fragmentary plan view showing a detail of the dial plate assembly of Figure 8;

Figure 10 is an elevational view of a removed ratchet shaft assembly; and

Figure 11 is a sectional view taken generally along the line 11—11 of Figure 10.

Referring more particularly to the drawings through use of the reference numerals applied thereto, the numeral 20 designates generally an impact meter which conforms to the teachings of the present invention. The meter 20 comprises a box or tray-like case 22 provided with a hinged cover 24. Preferably, the case 22 and cover 24 take the plan forms depicted in Figures 1 and 2, although this is not, of course, a requirement of the invention.

Considering Figures 3 and 4, it will be noted that the case 22 comprises a bottom or back wall 26 and a peripheral upstanding sidewall 28. This sidewall 28 is provided with spaced ears 30 at the extremities of its upper edge, and it is to these ears 30 that the cover 24 is pivoted.

A resilient gasket (not shown) may be provided between the underside of the cover 24 and the upper edge of the sidewall 28. The cover 24 is provided with transparent windows, including an arcuate window 32 and a circular window 34, as depicted in Figure 1. The lower, or free-swinging, end of the cover 24 is provided with a barrel nut 36 pivotally retained by a snap-ring or the like (not shown) for cooperation with a bolt 38 (Figures 2 and 4) pivotally mounted in a U-bracket 40 secured in the bottom 26 of the case 12. As indicated in the drawing, the nut 36 has a notch 41 which, along with a reduced portion 42 and a terminal knob 44 at the top of the bolt 38, enables a boxcar seal or the like to be inserted when the meter 12 is closed and secured.

Attention is directed to the symmetrical arrangement of the meter 20 about a medial line, such as the section line 4—4 of Figure 2. In view of this symmetry of arrangement, which extends to certain of the operative elements, it is deemed necessary to describe but one of the duplicated assembles, and it will be understood that elements and assemblies shown in the drawings, which are designated by primed reference numerals, may be considered to be mirror images of the elements designated by the corresponding unprimed numerals.

Referring now to Figures 3 and 4, a stud 46 upstanding from the back plate 26 of the case 12 pivotally receives a weight arm 48 surmounted by a washer 50, an indicating pointer 52, a collar 54, and a nut 56. The weight arm 48 is provided with a bushing 58 and rests upon an enlarged portion 60 of the stud 46. The free end of the weight arm 48 is provided with a lift plate 59 having an inclined upper edge 60 and a tab 62 formed as clearly illustrated in Figure 7. The lift plate 59 is secured to the end of the weight arm 48 by means of screws 64 and 66, one of which is elongated for the purpose of retaining one end of a tension spring 68. The other end of the spring 68 is adjustably retained by a screw 70 and an angle bracket 72, the latter secured to the bottom or back plate 26 of the case 12.

A centrally located post 74, mounted in rigid upstanding relation to the back plate 26 is provided with a resilient sleeve 76 of rubber or like material, and defines an index position to which the springs 68 and 68' bias the weight arms 48 and 48'. The upper end of the post 74 is provided with a portion 78 of reduced diameter for a purpose to appear.

A shaft assembly 80, shown removed in Figure 10, is located on the aforementioned medial line at a point adjacent the post 74. The assembly 80 comprises a ratchet wheel 82 having hook-like teeth 84 formed as clearly illustrated in Figure 11.

The wheel 82 is secured for rotation with a shaft 86 having pinion teeth 88 and being provided with upper and lower extensions 90 and 92. As best shown in Figure 4, the lower extension 92 is rotatably disposed in a hole 94 in the back plate 26. A guide-plate 96 (Figure 5) overlays the ratchet wheel 82 and has a central aperture 98 which provides ample clearance for rotation of the shaft 86. The guide-plate 96 is supported at each end by a spacer 100 and secured by means of screws 102 to the back plate 26.

Referring to Figure 5, the cooperation between the guide-plate 96 and the ratchet wheel 82 is such that one tooth 84 of the wheel 82 will project beyond each adjacent edge of the guide-plate 96. The arrangement is such that either of a pair of flexible wire actuators 104 and 104' secured to the weight arms 48 and 48', respectively, may engage a projecting tooth 84 and induce rotation of the shaft assembly 80. Figure 6, along with Figure 5, illustrates the securement of the wire 104 to the weight arm 48. The wire 104, having a U-shaped end portion 106, extends beneath the weight arm 48 and has a returned end portion 108, secured, as by soldering, in a holding bar 110 slidably disposed in a hole 112 extending transversely through the weight arm 48. The bar 110, and hence the wire 104, is retained in adjusted position by means of a setscrew 114.

A dial plate assembly 116 includes a dial plate 118, supported upon bosses 120 (Figure 3) formed integral with the sidewall 28 of the case 22, and supported also upon the upper end of the post 74. The plate 118 has a tab 121 provided with a hole 122 to receive the reduced end portion 78 of the post 74. A spring washer 124 is employed to retain the plate 118 on the post 74, while screws 126 secure it on the bosses 120. The plate 118 has a pair of holes 128 and 128' through which the studs 46 and 46' and the collars 54 and 54' extend.

A rotating assembly 130 is located centrally of the dial plate 118. The assembly 130 includes a counting gear 132 disposed beneath the plate 118 and a disc 134 and pointer 136 disposed above the plate 118. The parts 132, 134 and 136 are all press-fitted on a rivet 138 which itself extends freely and rotatably through a hole 140 in the plate 118. Thus, it is apparent that all parts of the rotating assembly 130 rotate together. The reduced end portion 90 of the shaft 86 extends rotatably through a hole 142 in the plate 118, the location of this hole being such that the pinion teeth 88 may mesh with the teeth of the counting gear 132.

A detent arrangement shown in enlarged scale in Figure 9, comprises a detent lever 144 pivotally mounted on a rivet 146 secured to the dial plate 118 and having a detent finger 148 engageable between adjacent teeth of the counting gear 132. A hairspring 150, shaped as clearly shown in the drawing, has one end inserted in a hole provided in the lever 144 and the other secured by a rivet 152 to the plate 118. Clearly, the detent lever 144 prevents clockwise rotation of the gear 132 as viewed in Figures 8 and 9, while permitting counterclockwise rotation. At the same time, inadvertent counterclockwise movement is prevented by virtue of the spring biased insertion of the finger 148 between two teeth of the gear 132.

Referring once more to Figure 2, the pointer 136 has an extended point 154 which cooperates with dial markings designated generally by the numeral 156 to indicate changes in position in the rotating assembly 130. The dial markings 156 are provided on the stationary dial plate 118. The pointer 136 is provided with upturned tabs 158, by means of which the rotating assembly can be turned clockwise until the point 154 reaches the zero position.

A scale plate 160, shown best in Figure 2, is supported upon bosses 162 formed integral with the sidewall 28 of the case 22 (Figure 3) and is retained by screws 164. The plate 160 is provided with scale markings 166 and 166' extending each way from a medial line through the plate, and the lower edge of the plate 160 is provided with a series of notches 168. As indicated in Figures 2 and 3, the notches 168 are adapted to accommodate a downturned tab 170 provided at the side of a point portion 172 of the pointer 52, there being also a similar construction in respect to the pointer 52'. It will be understood that these pointers are of flexible material so that the free ends may be lifted to withdraw the tabs 170 and 170' from the notches 168. This lifting action may be effected automatically by engagement of the inclined edges 60 and 60' of the lift plates 58 and 58', or manually by means of upstanding knobs 174 and 174' on the pointers.

Immediately above the scale markings 166 and 166', the scale plate 160 is provided with arcuate slots 176 and 176', which serve to accommodate movable indicators 178 and 178', respectively.

In use, the impact meter 20 is normally mounted with the bottom wall 26 of the case 22 in a vertical position, although this is not essential to the operation of the device. It is essential, however, that the meter 20 be mounted so that the plane of pivotal movement of the weight arms 48 and 48' will be parallel to the direction in which critical force impulses may be expected. For example, for shipments in railway boxcars a meter 20 might very well be secured to the side of the boxcar where it will be effective to register the maximum longitudinal bumps or force impulses to which the boxcar is subjected. It will be noted that the wall 26 of the case 22 is provided with mounting holes 180 for thus mounting the meter 20. It is not, of course, required that the meter 20 be mounted on a shipping vehicle; it may be preferred in certain instances to mount it directly on a box or crate which is being shipped.

Wherever mounted, it is obvious that impact forces which are effective to induce substantial acceleration of the meter 20, parallel to the wall 26, will result in momentary displacement of at least one of the arms 48 and 48'. To be more specific, and considering the illustrations of the drawings, it is clear that a substantial acceleration of the meter 20 to the right will, through inertia, effect pivotal movement of the weight arm 48 in a counterclockwise direction against the tension of the spring 68. Assuming the pointer 52 to be initially disposed at the lower end of the scale 166, this movement of the weight arm 48 will cause the upper edge 60 of the lift plate 58 to raise the point portion 172 sufficiently to withdraw the downturned tab 170 from the notches 168, and the tab portion 62 of the plate 58 will then carry the pointer 52 to the left along with the weight arm 48. Upon completion of its counterclockwise pivotal movement, the weight arm 48 will be immediately returned to its index, or zero, position by action of the spring 68.

The pointer 52, on the other hand, will remain in the position to which it was deflected, due in part to inertia and in part to friction in its pivoted joint, and the tab 170 will engage a new slot 168, thereby maintaining the pointer 52 against undesired movement in either direction.

If, subsequently, a similar acceleration, but one of greater magnitude, should be sustained by the meter 20 the weight arm 48 will be caused to pivot a greater distance from its index position, the pointer 52 will be similarly displaced to a new position. Thus, the pointer 52 is free to be moved from a previous indicating position so as to indicate a subsequent departure of the weight arm 48 from its index position. It is, of course, clear that acceleration of the meter 20 to the left, as viewed in the drawings, will effect a corresponding movement of the weight arm 48' and pointer 52' in a clockwise direction.

As pointed out above, each significant acceleration of the meter 20 is accompanied by pivotal movement of one or the other of the weight arms 48 and 48'. These movements comprise a departure from an immediate return of the affected weight arm to its index position. As is clear from the illustration of Figure 5 then, the return movement of either weight arm 48 or 48' is effective to engage the end 106 or 106' of the flexible wire 104 or 104' with a tooth 84 of the ratchet wheel 82. This effects rotation of the whole shaft assembly 80 and of the rotating assembly 130 meshed therewith. Thus, as a result of each departure of a weight arm from its index position, the counting gear 132 will be advanced one tooth position, there to be retained pending a further movement of a weight arm. The point 154 is advanced to indicate the foregoing action on the dial 156. Inasmuch as the weight arms must move sufficiently to enable the bent portion 106 or 106' of the wire 104 or 104' to engage beneath a tooth 84 of the ratchet wheel 82 before a count of the particular impact can be made, it is obvious that the impulse must be one exceeding the minimum necessary to effect such engagement. Thus, only the impulses above a predetermined minimum will be counted. The minimum impulse to be regarded as significant may be selectively established by positioning the holder 110 or 110' in the weight arm 48 or 48' so as to extend the portion 106 or 106' of the wire 104 or 104' different distances from the weight arm. Obviously, the greater the distance of extension, the higher will be the critical minimum acceleration. The minimums in the two directions in which the meter 20 is effective may be different in degree.

Clearly, there has been provided an impact meter which fulfills the objects and advantages sought therefor.

It is to be understood that the foregoing description and the accompanying drawings have been given only by way of illustration and example. It is further to be understood that changes in the form of the elements, rearrangement of parts, and the substitution of equivalent elements, all of which will be readily apparent to one skilled in the art, are contemplated as being within the scope of the present invention, which is limited only by the claims which follow.

What is claimed is:

1. In a device for measuring accelerations of the type having a first arm pivoted for displacement away from and back to a zero position responsive to an acceleration impact in one direction and a second arm pivoted for displacement away from and back to a zero position responsive to an acceleration impact in another direction, a pivoted pointer for and engageable by each arm upon displacement of the latter a greater distance than any previous displacement, whereby each pointer will measure the maximum one of a plurality of displacements of an arm, an acceleration counter comprising: a numbered dial and a dial pointer; an actuator connected to said dial pointer including a ratchet wheel; detent means permitting said ratchet wheel to rotate in a counting direction only; and a finger connected to each of said arms for driving engagement with said ratchet wheel; said fingers being so disposed to said ratchet wheel as to be opposed by said detent means upon movement of a respective arm away from its zero position so that said counter registers an acceleration only upon return of an arm to its zero position.

2. A device for registering accelerations or decelerations of a movable structure, said device comprising a rigid case adapted for securement to said movable structure, a plurality of inertia elements mounted in said case for independent movement relative thereto, means biasing each of said elements toward respective zero positions, an independently movable pointer associated with each of said inertia elements for individual displacing engagement thereby, each inertia element and its associated pointer being mounted on a common axis, said axes being parallel one with another, scale means in association with the pointers for indicating magnitudes of accelerations, and detent means for retaining each pointer in successive scale positions corresponding to successive positions of maximum advance of the respectively associated inertia elements, and a common counting mechanism for displacing engagement upon the return movement of each of the several inertia elements including a ratchet gear rotatably mounted on an axis parallel with the aforesaid axis and in driving connection with a counting gear and an associated indicating member, and detent means in engagement with said counting gear for retaining it in successive positions of displacement.

References Cited in the file of this patent

UNITED STATES PATENTS

| 665,998 | Davis | Jan. 15, 1901 |
| 855,039 | Baron | May 28, 1907 |
| 1,300,513 | Taylor | Apr. 15, 1919 |
| 1,583,044 | Hoyt | May 4, 1926 |
| 1,629,023 | Davis | May 17, 1927 |
| 1,924,658 | Sanders | Aug. 29, 1933 |
| 2,244,417 | Bacon | June 3, 1941 |
| 2,293,234 | Winter | Aug. 18, 1942 |
| 2,394,974 | Bevins | Feb. 19, 1946 |

FOREIGN PATENTS

| 646,028 | France | July 9, 1928 |
| 788,233 | France | July 22, 1935 |
| 147,609 | Switzerland | June 15, 1931 |